*(12)* United States Patent
Li et al.

(10) Patent No.: US 9,280,969 B2
(45) Date of Patent: Mar. 8, 2016

(54) MODEL TRAINING FOR AUTOMATIC SPEECH RECOGNITION FROM IMPERFECT TRANSCRIPTION DATA

(75) Inventors: Jinyu Li, Bellevue, WA (US); Yifan Gong, Sammamish, WA (US); Chaojun Liu, Kirkland, WA (US); Kaisheng Yao, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1528 days.

(21) Appl. No.: 12/482,142

(22) Filed: Jun. 10, 2009

(65) Prior Publication Data

US 2010/0318355 A1 Dec. 16, 2010

(51) Int. Cl.
*G10L 15/00* (2013.01)
*G10L 15/06* (2013.01)
*G10L 15/065* (2013.01)

(52) U.S. Cl.
CPC ............. *G10L 15/063* (2013.01); *G10L 15/065* (2013.01)

(58) Field of Classification Search
CPC ....... G10L 15/00; G10L 15/06; G10L 15/063; G10L 15/065; G10L 15/07; G10L 15/075; G10L 15/18183; G10L 15/187; G10L 15/19; G10L 2015/00; G10L 2015/063; G10L 2015/0631; G10L 2015/0635; G10L 2015/068; G10L 2015/06
USPC ......... 704/231, 235, 236, 239, 243, 251, 252, 704/254, 255, 257
See application file for complete search history.

(56) References Cited

U.S. PATENT DOCUMENTS

| 5,579,436 | A | | 11/1996 | Chou et al. |
| 6,029,124 | A | * | 2/2000 | Gillick et al. ................. 704/200 |
| 6,076,059 | A | * | 6/2000 | Glickman et al. ............ 704/260 |
| 6,263,308 | B1 | * | 7/2001 | Heckerman et al. .......... 704/231 |
| 6,272,462 | B1 | | 8/2001 | Nguyen et al. |

(Continued)

OTHER PUBLICATIONS

K. Kirchhoff, J.A. Bilmes, "Dynamic classifier combination in hybrid speech recognition systems using utterance-level confidence values," Acoustics, Speech, and Signal Processing, IEEE International Conference on, pp. 693-696, Acoustics, Speech, and Signal Processing, 1999. Proceedings. vol. 2, 1999 IEEE International Conference on, 1999.*

(Continued)

*Primary Examiner* — Paras D Shah
(74) *Attorney, Agent, or Firm* — Steven Spellman; Fehmi Chebil; Micky Minhas

(57) ABSTRACT

Techniques and systems for training an acoustic model are described. In an embodiment, a technique for training an acoustic model includes dividing a corpus of training data that includes transcription errors into N parts, and on each part, decoding an utterance with an incremental acoustic model and an incremental language model to produce a decoded transcription. The technique may further include inserting silence between a pair of words into the decoded transcription and aligning an original transcription corresponding to the utterance with the decoded transcription according to time for each part. The technique may further include selecting a segment from the utterance having at least Q contiguous matching aligned words, and training the incremental acoustic model with the selected segment. The trained incremental acoustic model may then be used on a subsequent part of the training data. Other embodiments are described and claimed.

15 Claims, 8 Drawing Sheets

(56) References Cited

U.S. PATENT DOCUMENTS

| | | | |
|---|---|---|---|
| 6,275,795 B1 | 8/2001 | Tzirkel-Hancock | |
| 6,374,221 B1* | 4/2002 | Haimi-Cohen | 704/256.1 |
| 6,535,849 B1* | 3/2003 | Pakhomov et al. | 704/235 |
| 6,961,700 B2* | 11/2005 | Mitchell et al. | 704/235 |
| 6,985,860 B2* | 1/2006 | Nakatsuka | 704/244 |
| 7,006,972 B2* | 2/2006 | Hwang | 704/244 |
| 7,149,687 B1* | 12/2006 | Gorin et al. | 704/243 |
| 7,216,077 B1* | 5/2007 | Padmanabhan et al. | 704/240 |
| 7,216,079 B1* | 5/2007 | Barnard et al. | 704/244 |
| 7,286,984 B1 | 10/2007 | Gorin et al. | |
| 7,310,600 B1 | 12/2007 | Garner et al. | |
| 7,562,010 B1* | 7/2009 | Gretter et al. | 704/9 |
| 7,860,716 B2* | 12/2010 | Tian et al. | 704/251 |
| 7,881,930 B2* | 2/2011 | Faisman et al. | 704/235 |
| 2004/0117183 A1* | 6/2004 | Deligne et al. | 704/248 |
| 2006/0074656 A1 | 4/2006 | Mathias et al. | |
| 2006/0149558 A1 | 7/2006 | Kahn et al. | |
| 2007/0083373 A1* | 4/2007 | Liu et al. | 704/256.2 |
| 2007/0192095 A1* | 8/2007 | Braho et al. | 704/232 |
| 2007/0219798 A1* | 9/2007 | Wang et al. | 704/257 |
| 2008/0052075 A1* | 2/2008 | He et al. | 704/256 |
| 2008/0091424 A1* | 4/2008 | He et al. | 704/240 |
| 2008/0114595 A1 | 5/2008 | Vair et al. | |
| 2008/0120109 A1* | 5/2008 | Ding | 704/255 |
| 2008/0270129 A1 | 10/2008 | Colibro et al. | |
| 2008/0270133 A1* | 10/2008 | Tian et al. | 704/251 |
| 2009/0043581 A1* | 2/2009 | Abbott et al. | 704/254 |
| 2009/0112595 A1* | 4/2009 | Ljolje | 704/256.2 |
| 2010/0228548 A1* | 9/2010 | Liu et al. | 704/251 |

OTHER PUBLICATIONS

Li, Jinyu. Soft margin estimation for automatic speech recognition. ProQuest, 2008.*

Chien, et al., "Predictive Minimum Bayes Risk Classification for Robust Speech Recognition", Retrieved at <<http://www.ks.cs.titech.ac.jp/publication/2007/IS2007_1062.pdf>>, Interspeech 2007, 8th Annual Conference of the International Speech Communication Association, Aug. 27-31, 2007, pp. 1062-1065.

Ruoxun, Fu, "A Probabilistic Approach to Processing Imperfect Transcription in Real World Speech Recognition", Retrieved at <<http://www.inf.ed.ac.uk/publications/thesis/online/IM070497.pdf>>, Master of Science, School of Informatics, University of Edinburgh, 2007, pp. 1-70.

Nguyen, et al., "Light Supervision in Acoustic Model Training", Retrieved at <<http://ieeexplore.ieee.org/stamp/stamp.jsp?arnumber=01325953>>, IEEE International Conference on Acoustics, Speech and Signal Processing, vol. 1, May 17-21, 2004, pp. 185-188.

Li, et al., "Soft Margin Estimation with Various Separation Levels for LVCSR", Retrieved at <<http://users.ece.gatech.edu/~jinyuli/resume/smewordphone.pdf>>, In the Proceedings of Interspeech 2008, 9th Conference in the Annual Series of Interspeech, Sep. 22-26, 2008, pp. 4.

Gollan, et al., "Confidence Scores for Acoustic Model Adaptation", Retrieved at << www-i6.informatik.rwth-aachen.de/publications/download/581/Gollan-ICASSP-2008.pdf ->>, IEEE International Conference on Acoustics, Speech and Signal Processing, Mar. 31-Apr. 4, 2008, pp. 4.

* cited by examiner

US 9,280,969 B2

MODEL TRAINING FOR AUTOMATIC SPEECH RECOGNITION FROM IMPERFECT TRANSCRIPTION DATA

BACKGROUND

Automatic speech recognition technology typically utilizes a corpus to translate speech data into text data. A corpus is a database of speech audio files and text transcriptions of the audio files in a format that can be used to form acoustic models. One way to improve an acoustic model is to provide a large corpus. Conventionally, however, very large amounts of correctly transcribed audio data are not available, or may be very expensive to produce. Large amounts of transcribed audio are available, for example, in the form of close-captioning for television programs. However, these sources usually contain errors. Use of these imperfect transcription corpuses can lead to suboptimal acoustic models. Consequently, techniques to permit the reliable use of imperfect transcription sources are desirable. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques and systems for training automatic speech recognition (ASR) systems using large amounts of imperfectly transcribed speech data. In one embodiment, for example, a technique may include dividing a corpus of training data that includes transcription errors into N parts, and on each part, decoding an utterance with an incremental acoustic model and an incremental language model to produce a decoded transcription. The technique may further include inserting silence between a pair of words into the decoded transcription and aligning an original transcription corresponding to the utterance with the decoded transcription according to time for each part. The technique may further include selecting a segment from the utterance having at least Q contiguous matching aligned words, and training the incremental acoustic model with the selected segment. The trained incremental acoustic model may then be used on a subsequent part of the training data.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments are directed to various automatic speech recognition (ASR) training techniques. The ASR training techniques may make it possible to make use of large amounts, e.g. more than 10,000 hours, of imperfect transcription data to train acoustic models and language models.

In general, an ASR system may implement various techniques to train an acoustic model based on large amounts of lightly supervised data that contain incorrect or inaccurate transcriptions. As a result, embodiments may improve training and adaptation operations that lead to improved acoustic models. Improved acoustic models may reduce transcription errors when performing ASR on speech. Further, the techniques may improve acoustic models while reducing the costs of training such models.

In an embodiment, a large corpus may be divided into N parts of M duration. A training system may perform up to N rounds of data selection from these N parts of the corpus. The training system may use more general acoustic and language models in initial rounds to select accurately transcribed words from the corpus. The training system may use the selected words to build an acoustic model to learn the easy and reliable parts of the corpus. In later rounds, the training system may use more "aggressive" language models to select more words from the corpus in order to learn more difficult clues for acoustic model building.

For example, in a first round, a language model may be built using text from one of the N parts of speech data of M duration. In the second round, a number L of language models may be built, where each of the L language models uses text from M/L duration of speech. Subsequent rounds may use even more specific language models. In the extreme, every utterance may have a unique language model, which may be implemented by putting all the words as arcs, with high weights, together with the original general language model. The acoustic model may be incrementally developed with each round. Each round may use the final acoustic model from the previous round. This technique may allow building of more specific models, and may allow the use of more words from the corpus.

Figure 1:
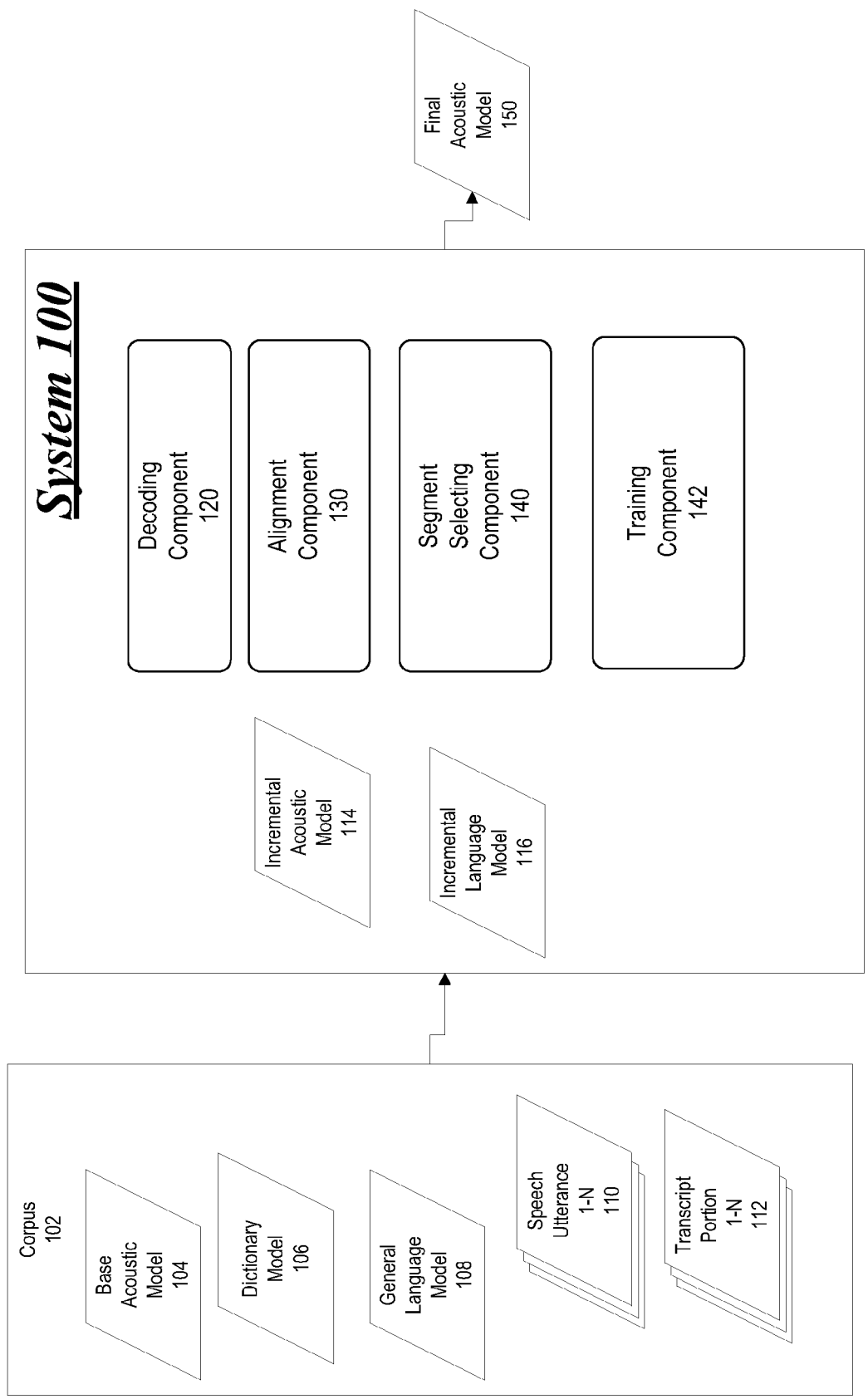
FIG. 1 illustrates an embodiment of a system.

FIG. 1 illustrates a block diagram for a system 100. The system 100 may generally implement techniques to train acoustic models that may be used to convert speech (e.g., words, phrases, utterances, etc.) into machine-readable input (e.g., text, character codes, key presses, etc.) and/or human-readable input. The machine-readable input may be used for a number of automated applications including without limitation dictation services, controlling speech-enabled applications and devices, interactive voice response (IVR) systems, mobile telephony, multimodal interaction, pronunciation for computer-aided language learning applications, robotics, video games, digital speech-to-text transcription, text-to-speech services, telecommunications device for the deaf (TDD) systems, teletypewriter (TTY) systems, text telephone (TT) systems, unified messaging systems (e.g., voicemail to email or SMS/MMS messages), and a host of other applications and services. The embodiments are not limited in this context.

In the illustrated embodiment shown in FIG. 1, system 100 may comprise a computer-implemented system having multiple components. System 100 may include, for example, decoding component 120, alignment component 130, segment selecting component 140, and training component 142.

System 100 may be a component of an automatic speech recognition application or system, or may be operable independently from an ASR system. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. Although system 100 as shown in FIG. 1 has a limited number of elements in a certain topology, it may be appreciated that system 100 may include more or less elements in alternate topologies as desired for a given implementation.

In some embodiments, system 100 may be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

Some or all of the components (including associated storage) may be communicatively coupled via various types of communications media. These components may coordinate operations between each other. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In various embodiments, system 100 may be arranged to generate a final acoustic model 150. The final acoustic model 150 may represent an acoustic model ready for use in ASR operations. Final acoustic model 150 may be constructed from a large corpus 102 made up of speech data and transcription of the speech data.

Corpus 102 may comprise a database of speech audio files and text transcriptions in a format that can be used to form acoustic models. In one embodiment, for example, corpus 102 may comprise a base acoustic model 104, a dictionary model 106 and a general language model 108.

The base acoustic model 104 may include a set of model parameters representing the acoustic characteristics for the set of speech audio files in corpus 102. The model parameters may represent acoustic characteristics for each predetermined unit, such as phonetic-linguistic-units. The acoustic characteristics may include individual phonemes and syllables for recognizing speech in a given language. Different models can be used, such as hidden Markov models (HMMs), neural networks, and so forth. The speech audio files may comprise various types of speech audio files, including read speech (e.g., book excerpts, broadcast news, word lists, number sequences, etc.) and spontaneous speech (e.g., conversational speech). The speech audio files may also represent speech from any arbitrary number of speakers.

The dictionary model 106 may comprise a word dictionary that describes phonology of the speech in a relevant language. The language model 108 may describe how to link or combine the words registered in the dictionary model 106 in a relevant language. For instance, the language model may use grammar rules based on a context-free grammar (CFG) and/or a statistic word linking probability (N-gram). In an embodiment, the speech data in corpus 102 may be divided into N speech utterance parts 110 and N corresponding transcript portions 112.

Corpus 102 may be used during development or manufacturing stages for system 100 and/or for final acoustic model 150, prior to deployment to customers or end users. For instance, corpus 102 may be used to train final acoustic model 150, which may then be sold alone or with an ASR system as computer program instructions embodied on a computer-readable medium (e.g., flash memory, magnetic disk, optical disk, etc.).

When training the final acoustic model 150, system 100 may incrementally build an incremental acoustic model 114 and an incremental language model 116. Prior to beginning the training process, incremental acoustic model 114 may be the base acoustic model 104, and incremental language model 116 may be the general language model 108.

System 100 may include a decoding component 120. Decoding component 120 may use incremental acoustic model 114 and incremental language model 116 to decode an utterance from corpus 102. Decoding may include performing speech recognition on the utterance to produce a decoded transcript.

System 100 may include an alignment component 130. Alignment component 130 may align an utterance from the corpus of training data with its corresponding original transcription to produce a time-aligned transcription. Alignment component 130 may align the time-aligned transcription with the decoded transcript.

System 100 may include a segment selecting component 140. Segment selecting component 140 may select a segment from the utterance that has at least Q contiguous matching time-aligned words. Time-based alignment may cause some words to be cut in the middle. Inserting the silence may allow the recovery of the cut-off portion of a word. To achieve this, segment selecting component 140 may extract a word segment by examining whether there is a silence before each word in the segment. A silence before a word may indicate that the word was cut. Therefore, if there is a silence, segment selecting component 140 may include that silence. An example of segment selection is described further below with respect to FIG. 6.

System 100 may include a training component 142. Training component 142 may train the incremental acoustic model 114 with one or more selected segmens and after a number of iterations, generate final acoustic model 150. The training may be according to conventional acoustic model training techniques. Training component 142 may revise the incremental language model for the next iteration, which is described in further detail below.

System 100 may evaluate the final acoustic model 150, or incremental acoustic model 114 by comparing the accuracy of the acoustic model to a model built from a similar amount of training data with clean transcription. If the accuracies are similar, then the quality may be deemed sufficient for proceeding to a next round of training, or for finalizing the final acoustic model 150. If the quality is deemed insufficient, then the technique may be repeated using stricter selection criteria to select more reliable data.

Figure 2:
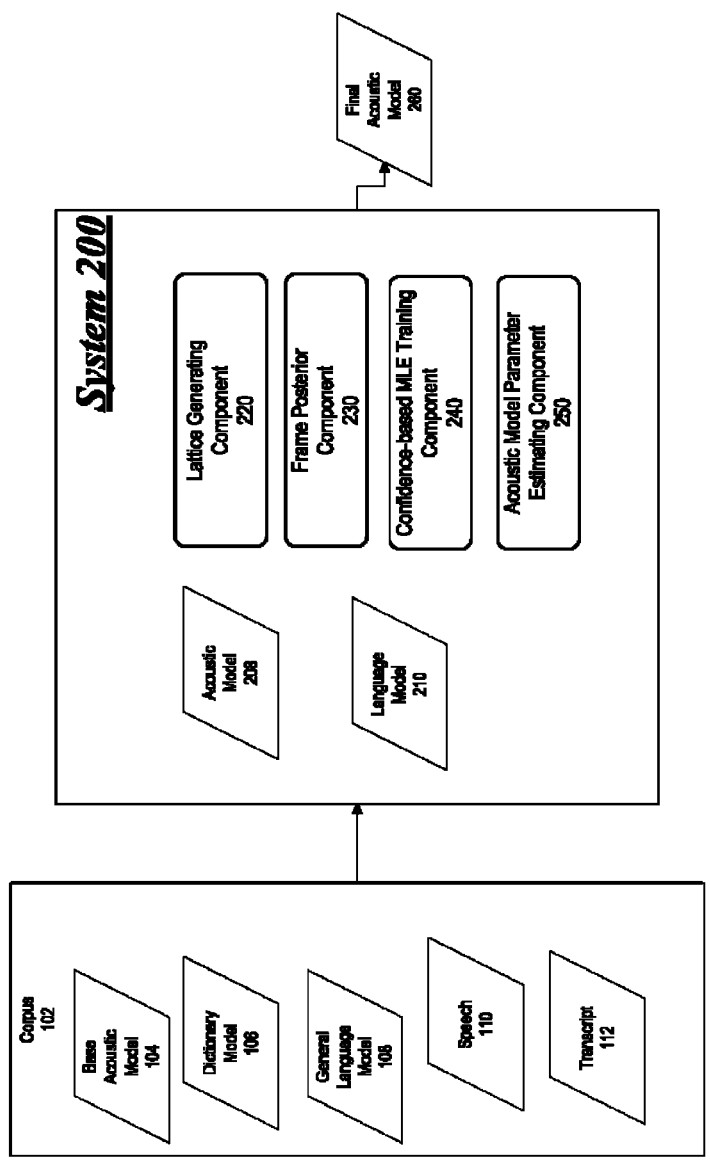
FIG. 2 illustrates an embodiment of a system.

FIG. 2 illustrates a block diagram for a system 200. System 200 may generally implement techniques to train acoustic models. System 200 may comprise a computer-implemented system having multiple components. System 200 may include, for example, lattice generating component 220, frame posterior component 230, confidence-based MLE training component 240, and acoustic model parameter estimating component 250. System 200 may be a component of an automatic speech recognition (ASR) application or system, or may be operable independently from an ASR system.

In various embodiments, system 200 may be arranged to generate a final acoustic model 260. The final acoustic model 260 may represent an acoustic model ready for use in ASR operations. Final acoustic model 260 may be constructed from large corpus 102. Generally, system 200 may be operative to use most or all of the data from corpus 102, evaluate the confidence of every frame of data and integrate that confidence into model training formulas.

Lattice generating component 220 may decode speech 110 from corpus 102 using an available acoustic model, such as acoustic model 208, and generate a lattice. A lattice may include many word nodes and connecting arcs, and may represent one or more possible decoding candidates of an utterance. Lattice generating component 220 may merge the decoded lattice with transcript 112. Lattice generating component 220 may label each word w in the merged lattice as correct or not by examining whether the word is substantially overlapped with corresponding word from transcript 112.

Frame posterior component 230 may calculate a frame posterior for each correct word in the merged lattice. The frame posterior q(t) of time t may be computed by summing the posterior probabilities of all the correct words passing time t:

$$q(t) = \sum_{\substack{w|t_{ws}<=t<=t_{we} \\ \wedge w \in CorrectSet}} p(w|t_{ws}, t_{we}, O). \quad (1)$$

In equation (1), w is in a time interval $[t_{ws}, t_{we}]$ and is labeled as a correct word, O is the current speech signal from speech 110.

Confidence-based maximum likelihood estimation (MLE) training component 240 may modify a conventional MLE technology for model parameter estimation in speech recognition. MLE is a known statistical method for fitting a statistical model to data. MLE may be used to find an unknown mean and an unknown variance in a sample data distribution. MLE may be used conventionally in speech recognition for acoustic model parameter estimation.

Given a speech signal and corresponding transcription, MLE may use, for example, the Baum-Welch algorithm, to estimate acoustic model parameters. The Baum-Welch algorithm may conventionally be used to find unknown parameters of a hidden Markov model (HMM). The Baum-Welch algorithm may have two steps: first, calculating a forward probability and a backward probability for each HMM state; and second, determining the frequency of transition-emission pair values and dividing the frequency by the probability of the entire sequence on the basis of the forward and backward probabilities. In practice, this may mean calculating the expected count of a particular transition-emission pair. Each time a particular transition is found, the value increases of the quotient of the transition divided by the probability of the entire string, and transition value is updated to the increased value.

The conventional update formulas for the model parameters of mean and variance for the jth state and kth mixture model may be:

$$\text{Mean: } \mu_{jk} = \frac{\sum_{t=1}^{T} \bar{\zeta}_{jk}(t)O(t)}{\sum_{t=1}^{T} \bar{\zeta}_{jk}(t)} \quad (2)$$

$$\text{Variance: } \sigma_{jk}^2 = \frac{\sum_{t=1}^{T} \bar{\zeta}_{jk}(t)(O(t)-\mu'_{jk})(O(t)-\mu'_{jk})^t}{\sum_{t=1}^{T} \bar{\zeta}_{jk}(t)} \quad (3)$$

In formulas (2) and (3), $\zeta_{jk}(t)$ is a posterior computed in a conventional backward-forward process given the transcription.

However, the above estimations assume that the underlying transcription is reliable. Confidence-based (MLE) training component 240 may adjust the posterior term $\zeta_{jk}(t)$ in in formulas (2) and (3) according to the frame posterior. In an embodiment, soft confidence training may be used, where the conventional posterior is multiplied by the frame posterior in (1):

$$\bar{\zeta}_{jk}(t) = q(t)\zeta_{jk}(t) \quad (4).$$

In an embodiment, hard confidence training may be used, where the conventional posterior is used if its value is greater than some threshold between 0 and 1, and is set to zero otherwise:

$$\bar{\zeta}_{jk}(t) = \begin{cases} \zeta_{jk}(t) & \text{if } q(t) > th \\ 0 & \text{else} \end{cases} \quad (5)$$

Acoustic model parameter estimating component 250 may estimate model parameters by separating the correct transcription from other transcriptions. Acoustic model parameter estimating component 250 may use a confidence measure to select reliable frames/transcriptions for discriminative training. In an embodiment, maximum mutual information estimation (MMIE) may be used. MMIE may be an alternative to MLE. Other discriminative training methods can be applied without limitation.

Conventionally, MMIE separates the statistics of a numerator lattice, corresponding to a correct transcription, from the statistics of the decoding lattice. The update formulas for the model parameters of mean and variance for the jth state and kth mixture model are:

$$\text{Mean: } \mu_{jk} = \frac{\theta_{jk}^{num}(O) - \theta_{jk}^{den}(O) + D_{jk}\mu'_{jk}}{\gamma_{jk}^{num} - \gamma_{jk}^{den} + D_{jk}} \quad (6)$$

$$\text{Variance: } \sigma_{jk}^2 = \frac{\theta_{jk}^{num}(O^2) - \theta_{jk}^{den}(O)^2 + D_{jk}(\sigma'^2_{jk} + \mu'^2_{jk})}{\gamma_{jk}^{num} - \gamma_{jk}^{den} + D_{jk}} - \mu_{jk}^2 \quad (7)$$

where $$\gamma_{jk}^{den} = \sum_{q=1}^{Q} \sum_{t=e_q}^{e_q} \gamma_{qjk}^{den}(t)\gamma_q^{den},$$

$$\theta_{jk}^{den}(O) = \sum_{q=1}^{Q} \sum_{t=e_q}^{e_q} \gamma_{qjk}^{den}(t)\gamma_q^{den}O(t), \text{ and}$$

$$\theta_{jk}^{den}(O^2) = \sum_{q=1}^{Q} \sum_{t=e_q}^{e_q} \gamma_{qjk}^{den}(t)\gamma_q^{den}O(t)^2.$$

Here, $\gamma_q^{den}$ represents the qth word/phone arc posterior in the decoding lattice. $\gamma_{qjk}^{den}(t)$ represents the posterior on the qth word/phone arc. Analogous equations may exist for the numerator terms and $\gamma_{jk}^{num}$, $\theta_{jk}^{num}(O)$, and $\theta_{jk}^{num}(O^2)$.

In an embodiment, acoustic model parameter estimating component 250 may augment confidence-based discriminative training by introducing the frame posterior. That is, the term $\gamma_{qjk}^{den}$ may be adjusted according to the frame posterior. In an embodiment, the term may be adjusted with soft confidence training, where the posterior on the qth word/phone arc is multiplied by the frame posterior:

$$\gamma_{qjk}^{den}(t) = q(t)\gamma_{qjk}^{den}(t) \quad (8).$$

In an embodiment, the term may be adjusted with hard confidence training, where the value of the posterior on the qth word/phone arc is used if its value is greater than some threshold between zero and one, or set to zero otherwise:

$$\gamma_{qjk}^{num}(t) = \begin{cases} \gamma_{qjk}^{den}(t) & \text{if } a(t) > th \\ 0 & \text{else.} \end{cases} \quad (9)$$

The adjusted model parameters may then be added to final acoustic model 260.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 3:
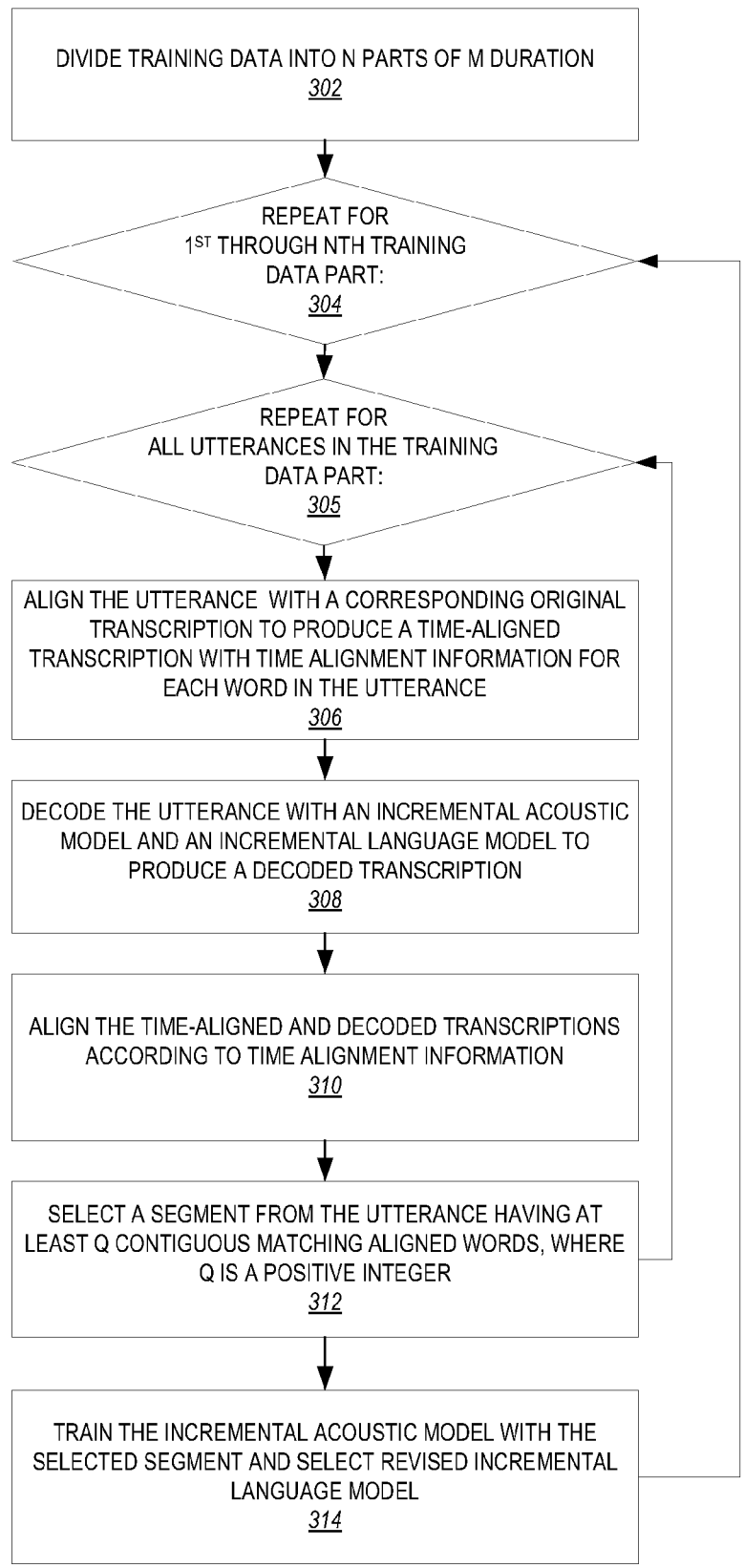
FIG. 3 illustrates an embodiment of a first logic flow.

FIG. 3 illustrates one embodiment of a logic flow 300. The logic flow 300 may be representative of some or all of the operations executed by one or more embodiments described herein.

Logic flow 300 may divide training data, such as corpus 102, into N parts of M duration, where N is a positive integer, in block 302. Beginning at block 304, logic flow 300 may repeat the following procedures up to N times, one for each of the N parts of the training data.

Logic flow 300 may, beginning at block 305, repeat the following procedures for each utterance in the training data part under consideration in the current of the 1 to N iterations from block 304.

In block 306, logic flow 300 may align an utterance with its corresponding original transcription to produce a time-aligned transcription. The time-aligned transcription may include time alignment information for each word in the utterance.

In block 308, logic flow 300 may decode the same utterance. The utterance may be decoded according to an incremental acoustic model and an incremental language model, resulting in a decoded transcription.

The logic flow 300 may align the time-aligned and decoded transcriptions according to time alignment information in block 310. The alignment may be a time alignment.

The logic flow 300 may select one or more segments from the utterance that has at least Q contiguous matching time-aligned words in block 312. If not all of the utterances in the current training part have been decoded, then the logic flow 300 may return to block 305, otherwise flow may proceed to block 314.

The logic flow 300 may train the incremental acoustic model, e.g. incremental acoustic model 114, using the words in the selected segments in block 314. The training may be according to conventional acoustic model training techniques. The trained incremental acoustic model may then be used in the subsequent iteration beginning at block 304.

Additionally, in block 314 the incremental language model may be revised. For example, in the first iteration, the incremental language model may come from the corpus, or be built using text from first part of the divided training data. In the second iteration, a number L of language models may be built, where each of the L language models uses text from M/L duration of speech. Subsequent iterations may use even more specific language models, up to and including one language model for each utterance.

When the final iteration is complete, the acoustic model may be considered final and ready for use in an ASR operation.

Figure 4:
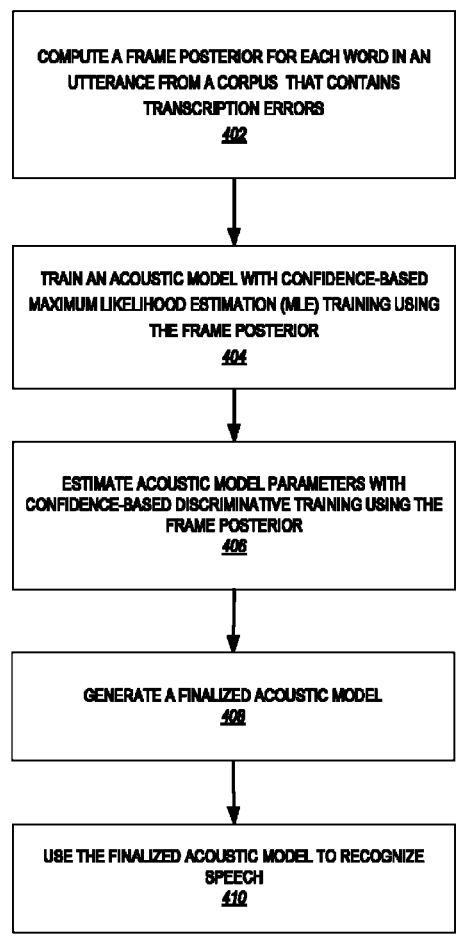
FIG. 4 illustrates an embodiment of a second logic flow.

FIG. 4 illustrates one embodiment of a logic flow 400. The logic flow 400 may be representative of some or all of the operations executed by one or more embodiments described herein.

Logic flow 400 may compute a frame posterior for each word in an utterance from a corpus that contains transcription errors in block 402. A frame posterior may represent the sum of posterior probabilities of correctly transcribed words passing in the frame's time period. Block 402 is described in more detail below with respect to FIG. 5.

Logic flow 400 may train an acoustic model using confidence-based maximum likelihood estimation (MLE) training that uses the frame posterior in block 404. In an embodiment, the mean and variance parameters represented in equations (2) and (3) above may be modified by the frame posterior from block 402, as represented in equation (1) above. If soft confidence training is used, the conventional posterior may be modified as represented in equation (4). If hard confidence training is used, the conventional posterior may be modified as represented in equation (5). The embodiments are not limited to this context.

Logic flow 400 may estimate one or more acoustic model parameters with confidence-based discrimination training that uses the frame posterior from block 402 and the confidence calculated in block 404, in block 406. In an embodiment, maximum mutual information estimation (MMIE) may be used to estimate the acoustic model parameters with discriminative training. Other discriminative training techniques may also be used. In an embodiment, the mean and variance model parameters of conventional MMIE may be modified by adjusting the posterior term with the frame posterior. That is, equations (6) and (7) may be updated with equation (8) for soft confidence training, or with equation (9) for hard confidence training.

Logic flow 400 may generate a finalized acoustic model, e.g. final acoustic model 260, using the estimated acoustic model parameters in block 408. The model parameters of the initial acoustic model, e.g. acoustic model 208, may be updates with the estimated model parameters derived from the corpus 102.

Logic flow 400 may use the finalized acoustic model to recognize speech in block 410. For example, if logic flow 400 is performed by an automatic speech recognition system, the ASR system may perform speech recognition on a speech signal using the finalized acoustic model. Logic flow 400 may provide the finalized acoustic model to a separate ASR system for performing speech recognition.

Figure 5:
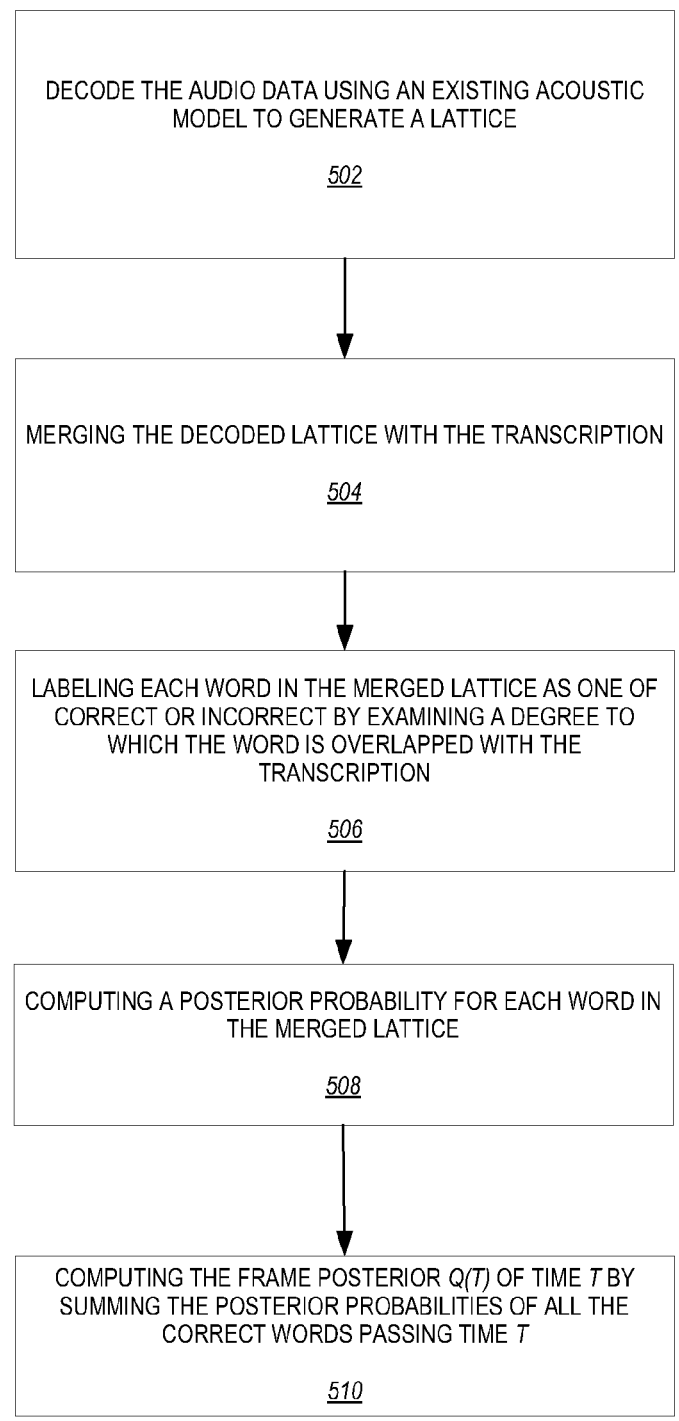
FIG. 5 illustrates an embodiment of a third logic flow.

FIG. 5 illustrates one embodiment of a logic flow 500. The logic flow 500 may be representative of some or all of the operations executed by one or more embodiments described herein to perform the function of block 402 from FIG. 4.

Logic flow 500 may decode the audio data in a speech signal from a corpus to generate a lattice, using an existing acoustic model, in block 502. Decoding may include performing speech recognition on the speech signal and generating a lattice that includes word nodes with one or more possible word candidates for a given utterance.

Logic flow 500 may merge the decoded lattice with the transcription from the corpus, in block 504.

Logic flow 500 may label each word in the merged lattice as either correct or not correct by examining the degree to which the decoded word is overlapped in time with the transcription, in block 506. For example, if two words with the same label are 90% overlapped in duration, the words may be considered to be matched. The embodiments are not limited to this example.

Logic flow 500 may compute a posterior probability for each word in the merged lattice, in block 708. The posterior probability is the probability that a word w would be recognized, given a time interval in the speech signal.

Logic flow 500 may compute the frame posterior in block 510. The frame posterior may be calculated by summing the posterior probabilities of all the words labeled "correct" in the lattice in a time frame, for example, using equation (1) above.

Figure 6:
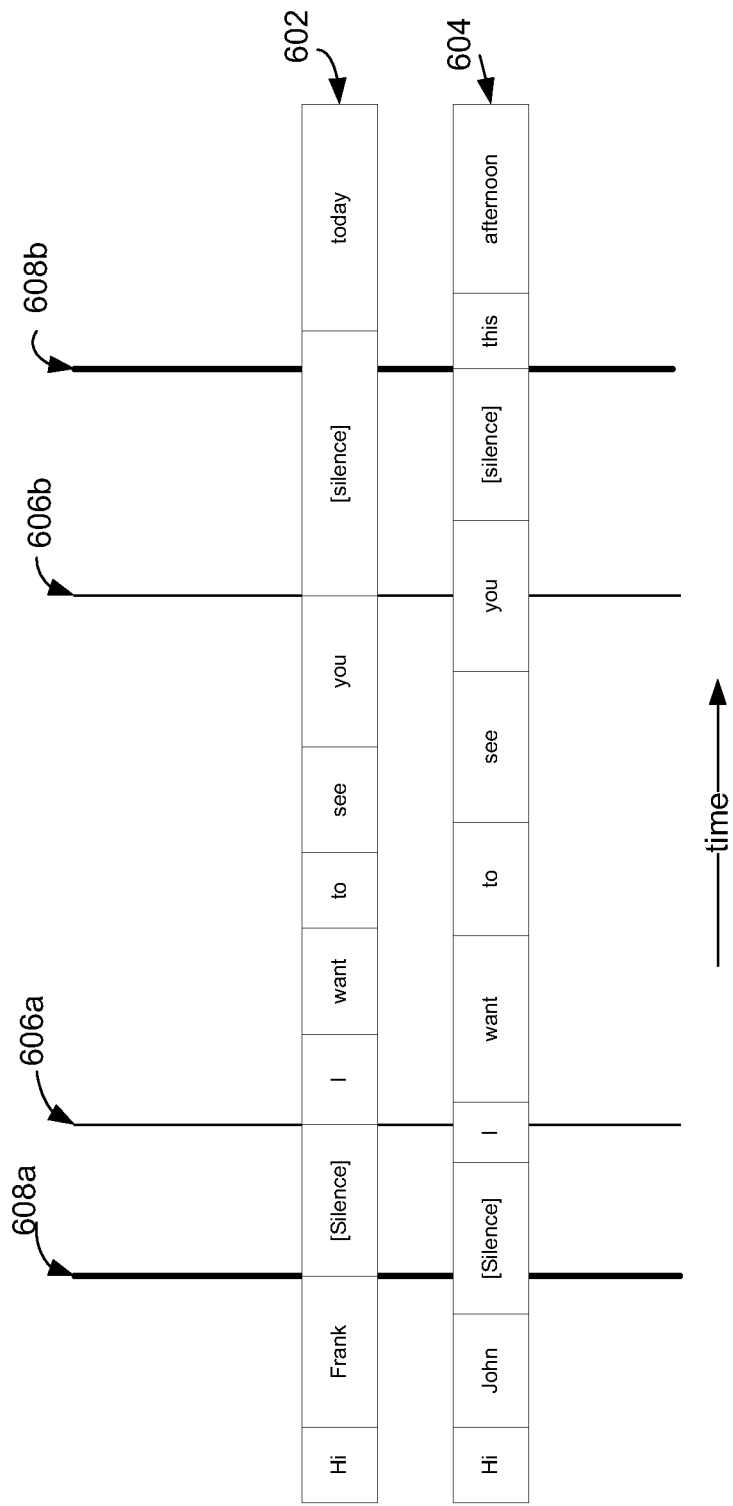
FIG. 6 illustrates an example of segment selection.

FIG. 6 illustrates an example of segment selection using silences, for example, according to blocks 310 and 312 of FIG. 3. FIG. 6 shows two transcriptions: an original transcription 602 from the corpus, and the corresponding decoded transcription 604. Conventional time alignment would create a segment at the end of the first silence, indicated by line 606a, and at the beginning of the second silence, indicated by line 606b. However, this alignment would result in the word "I" in the decoded transcription 604 being cut by line 606a, and the word "you" being cut by line 606b.

Instead, embodiments of the invention, when creating a segment, may look for silence preceding a set of matched words and/or silence following a selected segment including a set of matched words. In the example in FIG. 6, the matched words are "I want to see you". If there is a silence on either end of the segment, then the silence may be included in the selected segment. In the example in FIG. 6, the selected segment becomes the portion of the transcription 604 between lines 608a and 608b.

If there is no silence either preceding or succeeding the selected segment, then part of the silence from the beginning of the utterance may be inserted into the beginning of the selected segment, and part of the silence from the beginning of the utterance mya be appended to the end of the selected segment.

Figure 7:
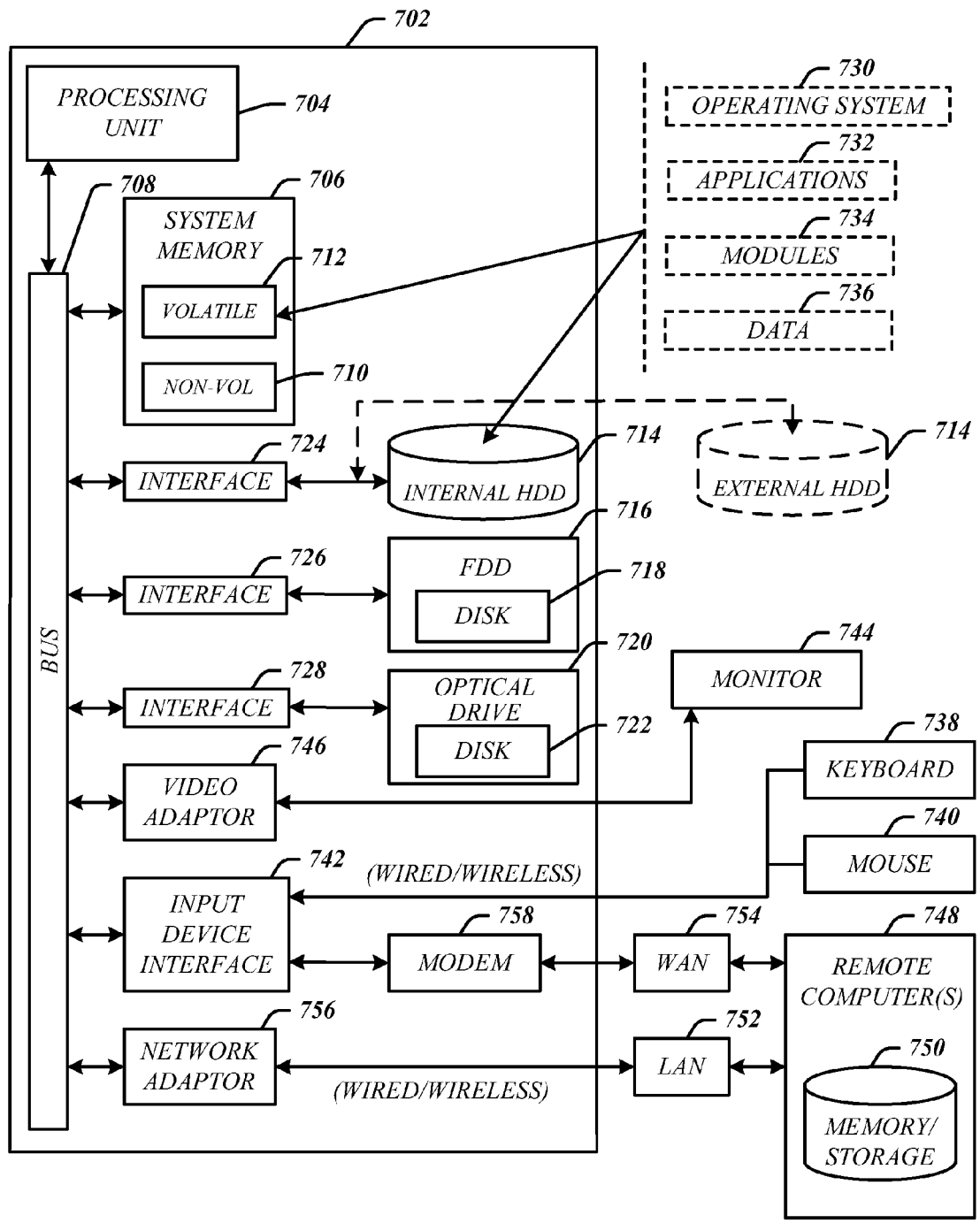
FIG. 7 illustrates an embodiment of a computing architecture.

FIG. 7 illustrates an embodiment of an exemplary computing architecture 700 suitable for implementing various embodiments as previously described, such as system 100 and system 200, for example. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, system 100 and its components, and/or system 200 and its components.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
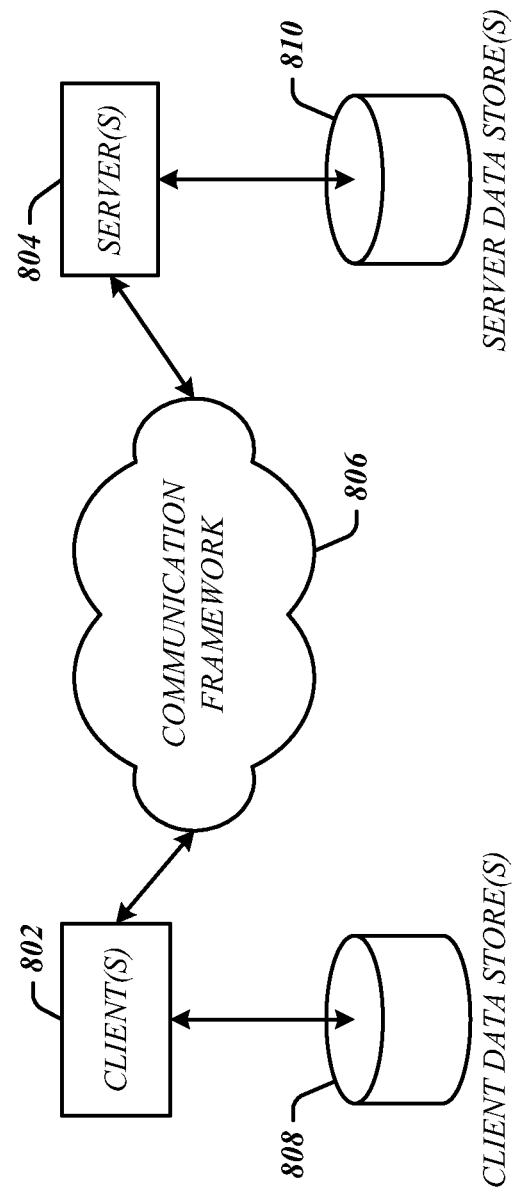
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement client systems that request speech recognition acoustic model training from system 100, 200. The servers 804 may implement the systems 100, 200. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
  a. aligning an utterance from a set of training data with a corresponding original transcription from the set of training data to produce a time-aligned transcription with time alignment information for each word in the utterance, wherein the set of training data includes transcription errors;
  b. decoding the same utterance with an incremental acoustic model and an incremental language model to produce a decoded transcription with time alignment information for each word;
  c. aligning the time-aligned and decoded transcriptions according to time alignment information;
  d. selecting all segments from the utterance having at least Q contiguous matching aligned words, where Q is a positive integer, by:
    including a silence in a selected segment comprising the Q matching aligned words when the selected segment is preceded or followed by a silence; and
    when there is no silence preceding or succeeding the selected segment:
    selecting the selected segment according to the original transcription with time alignment information; and
    inserting part of a silence segment from the beginning of the utterance into the beginning of the selected segment, and appending a part of a silence segment from the beginning of the utterance to the end of the selected segment;
  e. training the incremental acoustic model with the selected segments; and
  f. evaluating the accuracy of the incremental acoustic model built from the training data including transcription errors compared to the accuracy of an acoustic model built from a similar amount of training data having no transcription errors.

2. The computer-implemented method of claim 1, comprising:
  dividing training data comprising audio data and transcription data corresponding to the audio data into N parts of M duration, wherein each part includes one or more utterances each comprising a plurality of words, and wherein N and M are positive integers; and g. iterating 1.a. through 1.f. for each utterance in one of the N parts; and h. iterating 2.g. for each of the N parts.

3. The computer-implemented method of claim 2, comprising:

during a first iteration on a first part, building the incremental language model from the original transcription corresponding to the first part; and during a subsequent iteration on a subsequent part, building L incremental language models, where M/L is less than or equal to one, and where each of the L incremental language models uses a portion of M/L duration of the original transcription corresponding to the subsequent part.

4. A computer-readable hardware medium storing computer-executable program instructions that when executed cause a computing system to:

compute a frame posterior for each word in an utterance from a corpus comprising audio data and a corresponding transcription that contains transcription errors, wherein the instructions to compute the frame posterior include instructions that when executed cause the computing system to:

decode the audio data using an existing acoustic model to generate a lattice, merging the decoded lattice with the transcription, labeling each word in the merged lattice as one of correct or incorrect by examining a percentage to which the word is overlapped in duration with the transcription, computing a posterior probability for each word in the merged lattice, and computing the frame posterior q(t) of time t by summing the posterior probabilities of all the correct words passing time t for a time interval;

train an acoustic model with confidence-based maximum likelihood estimation (MLE) training using the frame posterior by estimating acoustic model parameters using the transcription, the audio data and the frame posterior;

estimate the acoustic model parameters with confidence-based discriminative training using the frame posterior;

evaluate the accuracy of the acoustic model built from the corpus including the corresponding transcription that contains transcription errors compared to the accuracy of an acoustic model built from a similar amount of training data having no transcription errors; and generate a finalized acoustic model.

5. The computer-readable hardware medium of claim 4, wherein the instructions to estimate model parameters include instructions that when executed cause the computing system to:

calculate the update formulas for mean ($\mu_{jk}$) and variance ($\sigma_{jk}^2$) for a jth state and a kth mixture model as:

$$\mu_{jk} = \frac{\sum_{t=1}^{T} \bar{\zeta}_{jk}(t)O(t)}{\sum_{t=1}^{T} \bar{\zeta}_{jk}(t)}$$

$$\sigma_{jk}^2 = \frac{\sum_{t=1}^{T} \bar{\zeta}_{jk}(t)(O(t)-\mu'_{jk})(O(t)-\mu'_{jk})^t}{\sum_{t=1}^{T} \bar{\zeta}_{jk}(t)}$$

wherein $\zeta_{jk}(t)$ is a posterior adjusted according to the frame posterior.

6. The computer-readable hardware medium of claim 5, wherein $\zeta_{jk}(t)$ is adjusted according to soft confidence training, wherein $$\bar{\zeta}_{jk}(t) = q(t)\zeta_{jk}(t).$$

7. The computer-readable hardware medium of claim 5, wherein $\zeta_{jk}(t)$ is adjusted according hard confidence training, wherein $$\bar{\zeta}_{jk}(t) = \begin{cases} \zeta_{jk}(t) & \text{if } q(t) > th \\ 0 & \text{else} \end{cases}.$$

8. The computer-readable hardware medium of claim 4, wherein the instructions to estimate acoustic model parameters with confidence-based discriminative training include instructions that when executed cause the computing system to:

estimate model parameters by separating statistics for a numerator lattice corresponding to the original transcription from the statistics of a decoding lattice generated by decoding the audio data with an existing acoustic model to generate the decoding lattice.

9. The computer-readable hardware medium of claim 8, wherein the instructions to estimate model parameters include instructions that when executed cause the computing system to:

calculate the update formulas for mean ($\mu_{jk}$) and variance ($\sigma_{jk}^2$) for a jth state and a kth mixture model as:

$$\mu_{jk} = \frac{\theta_{jk}^{num}(O) - \theta_{jk}^{den}(O) + D_{jk}\mu'_{jk}}{\gamma_{jk}^{num} - \gamma_{jk}^{den} + D_{jk}}$$

$$\sigma_{jk}^2 = \frac{\theta_{jk}^{num}(O^2) - \theta_{jk}^{den}(O^2) + D_{jk}(\sigma'^2_{jk} + \mu'^2_{jk})}{\gamma_{jk}^{num} - \gamma_{jk}^{den} + D_{jk}} - \mu_{jk}^2$$

where $$\gamma_{jk}^{den} = \sum_{q=1}^{Q} \sum_{t=e_q}^{e_q} \gamma_{qjk}^{den}(t)\gamma_q^{den}$$

$$\theta_{jk}^{den}(O) = \sum_{q=1}^{Q} \sum_{t=e_q}^{e_q} \gamma_{qjk}^{deb}(t)\gamma_q^{den}O(t)$$

$$\theta_{jk}^{den}(O^2) = \sum_{q=1}^{Q} \sum_{t=e_q}^{e_q} \gamma_{qjk}^{den}(t)\gamma_q^{den}O(t)^2$$

where $\gamma_q^{den}$ is the qth word/phone arc posterior in the decoding lattice, and $\gamma_{qjk}^{den}(t)$ is the posterior on the qth word/phone arc.

10. The computer-readable hardware medium of claim 9, wherein $\gamma_{qjk}^{den}(t)$ is adjusted according to soft confidence training, wherein:

$$\gamma_{qjk}^{den}(t) = q(t)\gamma_{qjk}^{den}(t).$$

11. The computer-readable hardware medium of claim 9, wherein $\gamma_{qjk}^{den}(t)$ is adjusted according to hard confidence training, wherein:

$$\gamma_{qjk}^{num}(t) = \begin{cases} \gamma_{qjk}^{den}(t) & \text{if } q(t) > th \\ 0 & \text{else} \end{cases}.$$

12. A system, comprising:
a processing unit;
an alignment component, executing on the processing unit, operative to align an utterance from a corpus of training data including transcription errors with a corresponding original transcription from the corpus of training data to produce a time-aligned transcription with time alignment information for each word in the utterance;
a decoding component, executing on the processing unit, operative to decode the utterance from the corpus of training data using an incremental acoustic model and an incremental language model to produce a decoded transcription; wherein the alignment component is operative to align the time-aligned transcription with the decoded transcription;
a segment selecting component, executing on the processing unit, operative to select a segment from the utterance having at least Q contiguous matching aligned words, where Q is a positive integer, by:
including a silence in a selected segment comprising the Q matching aligned words when the selected segment is preceded or followed by a silence; and
when there is no silence preceding or succeeding the selected segment, to:
selecting the selected segment according to the original transcription with time alignment information; and
inserting part of a silence segment from the beginning of the utterance into the beginning of the selected segment, and appending a part of a silence segment from the beginning of the utterance to the end of the selected segment; and
a training component, executing on the processing unit, to train the incremental acoustic model with the selected segment and to generate a final acoustic model.

13. The system of claim 12, wherein the decoding component uses a trained incremental acoustic model from the training component.

14. The system of claim 12, wherein the decoding component, alignment component, segment selecting component, and training component are operative to iterate over N parts of M duration of the corpus of training data.

15. The system of claim 14, wherein on a first iteration, the decoding component uses the incremental language model from the original transcription corresponding to the first part; and
the training component is operative to build L incremental language models for subsequent iterations, where M/L is less than or equal to one, and where each of the L incremental language models uses a portion of M/L duration of the original transcription corresponding to a subsequent part.

\* \* \* \* \*